United States Patent
Kim et al.

(10) Patent No.: US 9,633,044 B2
(45) Date of Patent: Apr. 25, 2017

(54) APPARATUS AND METHOD FOR RECOGNIZING IMAGE, AND METHOD FOR GENERATING MORPHABLE FACE IMAGES FROM ORIGINAL IMAGE

(71) Applicant: Korea Institute of Science and Technology, Seoul (KR)

(72) Inventors: Ig Jae Kim, Goyang-si (KR); Hee Seung Choi, Seoul (KR); Jaewon Kim, Seoul (KR); Junghyun Cho, Goyang-si (KR); Young-ju Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 49 days.

(21) Appl. No.: 14/310,036

(22) Filed: Jun. 20, 2014

(65) Prior Publication Data

US 2015/0286857 A1 Oct. 8, 2015

(30) Foreign Application Priority Data

Apr. 8, 2014 (KR) ......................... 10-2014-0041763

(51) Int. Cl.
*G06K 9/00* (2006.01)
*G06F 17/30* (2006.01)
*G06K 9/62* (2006.01)

(52) U.S. Cl.
CPC ... *G06F 17/30247* (2013.01); *G06K 9/00288* (2013.01); *G06K 9/6255* (2013.01)

(58) Field of Classification Search
CPC ..... G06K 9/00288; G06K 2009/00322; G06K 9/6253; G06F 17/30244

USPC .......................................................... 382/118
See application file for complete search history.

(56) References Cited

U.S. PATENT DOCUMENTS

| 8,861,804 | B1 * | 10/2014 | Johnson | G06K 9/00221 |
|  |  |  |  | 382/118 |
| 2009/0185723 | A1 * | 7/2009 | Kurtz | G06K 9/00288 |
|  |  |  |  | 382/118 |
| 2011/0222744 | A1 |  9/2011 | Kim et al. |  |

FOREIGN PATENT DOCUMENTS

| JP | 2001-43345 A | 6/2001 |
| KR | 10-0586382 B1 | 6/2006 |
| KR | 10-0621595 B1 | 9/2006 |
| KR | 10-2011-0101675 A | 9/2011 |
| KR | 10-2013-0132221 A | 12/2013 |

* cited by examiner

*Primary Examiner* — Manuchehr Rahmjoo
(74) *Attorney, Agent, or Firm* — NSIP Law

(57) ABSTRACT

Provided is an image recognition apparatus that identifies a person through a face of the person recognized from a photographed image, an image recognition method thereof and a face image generation method thereof.

The method for recognizing a face image includes generating candidate images including at least one morphable image which is generated using an object image, extracting first features from the generated candidate images, extracting second feature from a reference image, and generating at least one score corresponding to each of the at least one morphable image by comparing the first features with the second feature, and performing matching to calculate a final score from the generated at least one score.

13 Claims, 7 Drawing Sheets

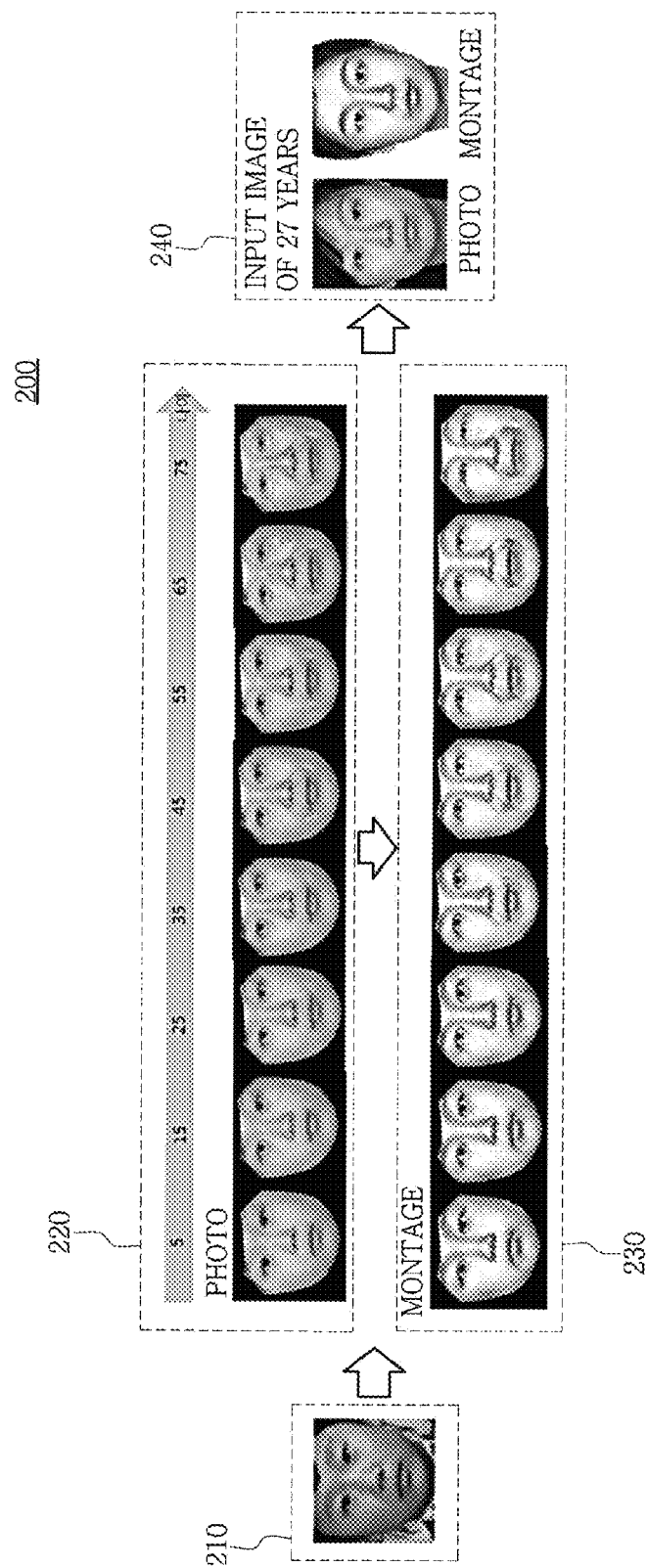

APPARATUS AND METHOD FOR RECOGNIZING IMAGE, AND METHOD FOR GENERATING MORPHABLE FACE IMAGES FROM ORIGINAL IMAGE

CROSS-REFERENCE TO RELATED APPLICATION

This application claims priority to Korean Patent Application No. 10-2014-0041763, filed on Apr. 8, 2014, and all the benefits accruing therefrom under 35 U.S.C. §119, the contents of which in its entirety are herein incorporated by reference.

BACKGROUND

1. Field

The present disclosure relates to apparatus and method for recognizing an image, and method for generating morphable face images from original image.

2. Description of Related Art

In various fields of society, there are various uses of techniques which compare an image taken by image photographing devices such as a camera with images previously stored in database to identify a person.

Typical examples of the uses of techniques includes an access security system which identifies a person by comparing a photographed face of the person with images of database and allows an access based on the identification results, a suspect identification/montage creation system which identifies a suspect or creates a montage of the suspect by comparing a photographed image of the suspect with database images, a system which provides a function of user authentication using image recognition, and the like.

However, a face image of human may often change depending on a momentary expression or a plastic surgery, and further, natural aging. Thus, even though he/she is the same person as one stored in database, conventional techniques often fail to successfully recognize him/her due to differences/changes between a current face image of him/her and the previously stored image of him/her.

There are many challenges to overcome this failure for recognizing identification, but no challenges can effectively overcome the face changes due to a momentary expression, a plastic surgery or natural aging

SUMMARY

A method for recognizing a human face image includes generating candidate images including at least one morphable image which is generated based on an object image, extracting at least one first feature from the generated candidate images, extracting second features from a reference image, and generating at least one score corresponding to each of the at least one morphable image by comparing the at least one first feature to the second features, and performing matching to calculate a final score from the generated at least one score.

A method for generating morphable face images from original image includes generating at least one morphable image from an object image, and generating at least one face image from the generated at least one morphable image, wherein the at least one morphable image is an image generated by modifying the object image differently based on a predetermined attribute using a feature extraction algorithm, and the predetermined attribute includes an age change, a gender change, an expression change, or a change derived from a plastic surgery.

An apparatus for recognizing a human face image includes an image acquisition unit to acquire an object image, a candidate group generation unit to generate candidate images including at least one morphable image from the object image, a feature comparison unit to extract at least one first feature from the generated candidate images, to extract second features from a reference image different from the object image, and to generate at least one score corresponding to each of the morphable images by comparing the at least one first feature to the second features, and a matching unit to perform matching to calculate a final score from the generated at least one score.

BRIEF DESCRIPTION OF THE DRAWINGS

FIG. 7 is a schematic diagram illustrating a method whereby an image recognition apparatus provides face images variously morphable using a modifiable face candidate group within limits to which sameness between original image and morphable image is maintained according to an exemplary embodiment.

DETAILED DESCRIPTION

Figure 1:
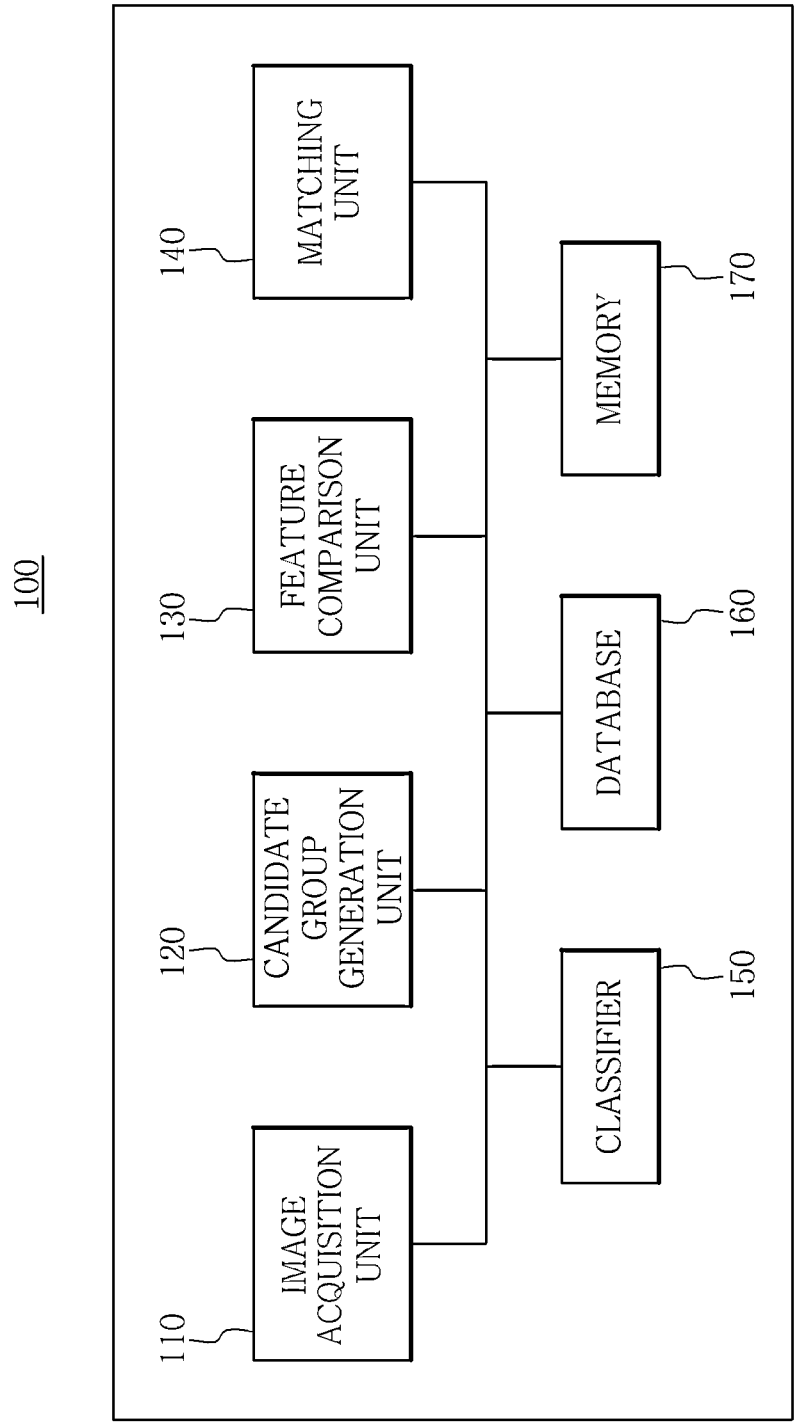
FIG. 1 is a block diagram illustrating a detailed construction of an image recognition apparatus according to an exemplary embodiment.

The following detailed description of the present disclosure is provided with reference to the accompanying drawings, in which particular embodiments by which the present disclosure may be practiced are shown for illustration. It should be understood that various embodiments of the present disclosure are different but do not need to be mutually exclusive. For example, a particular shape, structure, and feature stated in relation to a particular embodiment may be implemented as other embodiment within the spirit and scope of the present disclosure.

Also, it should be understood that various changes may be made on a location or placement of an individual component in each embodiment disclosed herein without departing from the spirit and scope of the present disclosure. The following detailed description is not intended to limit the present disclosure or specify its construction definitely, and the terms as used herein are selected for ease of interpretation and convenience of description. Meanwhile, in the event that like reference numerals are used in the drawings, like reference numerals indicate identical or similar functions in many embodiments.

Hereinafter, the scope and the spirit of the present disclosure will be described through specific embodiments by referring to the accompanying drawings.

FIG. 1 is a block diagram illustrating a detailed construction of an image recognition apparatus according to an exemplary embodiment. Referring to FIG. 1, the image recognition apparatus 100 includes an image acquisition unit 110, a candidate group generation unit 120, a feature comparison unit 130, a matching unit 140, a classifier 150, a database 160, and a memory 170.

The image acquisition unit 110 is a component used to acquire a photographed image of an object, and may include a module for photographing/imaging an object directly using an image photographing means such as a camera or a closed circuit camera (CCTV), or a module for reading or receiving an object image stored in a storage medium through a wired/wireless interface (for example, Universal Serial Bus (USB) 2.0, USB 3.0, a bus, a serial cable, Long-Term Evolution (LTE), Wireless Fidelity (WiFi), third Generation (3G), second Generation (2G), or other communication connection interfaces).

The image acquisition unit 110 may provide the image to other components of the image recognition apparatus 100. For example, the image recognition apparatus 100 may store the object image acquired by the image acquisition unit 110 in the database 160 or the memory 170.

The candidate group generation unit 120 generates at least one morphable image based on the object image acquired by the image acquisition unit 110. The generated morphable images are images modified to varying extents (that is, with predicted age or expression variations) based on a particular attribute (for example, an age or an expression), and may form candidate images. To do so, first, the candidate group generation unit 120 extracts features of a face from the object image using a feature extraction algorithm such as an Active Appearance Model (AAM). Here, the feature may be extracted based on ears, eyes, a nose and a mouth, a curvature point, a tone, a wrinkle, or a brightness difference on the face. Also, the candidate group generation unit 120 generates morphable images by manipulating at least some of the features extracted based on attributes of morphable images to be generated.

For example, in case in which morphable images are to be generated with varying ages of an object (that is, in the case where an attribute of morphable images are an age), the candidate group generation unit 120 sets values of features related to an age change to desired values and generates morphable images based on the set values, thereby acquiring morphable images to a face of a desired age range. Alternatively, in case in which morphable images is to be generated with varying expressions of an object (that is, in the case where an attribute of morphable images is an expression change), the candidate group generation unit 120 sets values of features related to an expression change to desired values and generates morphable images based on the set values, thereby acquiring an image in a desired expression state. However, this is just illustrative, and the candidate group generation unit 120 may generate morphable images based on various attributes other than an age. For example, the candidate group generation unit 120 may generate morphable images based on an expression change, a change derived from a plastic surgery, a gender change, and the like.

As an embodiment, the candidate group generation unit 120 may also generate various face images (for example, a montage or a photo) based on the photographed object image. For example, the candidate group generation unit 120 may generate morphable images reflecting a likely age change, expression change or change derived from a plastic surgery for the object image, and provide the generated morphable images as face images of the object.

As an embodiment, the candidate group generation unit 120 may set a limit value for a modification level to prevent the morphable images from losing sameness as the original object image due to excessive face modification. For example, in the case where the photographed object image is 30 years, limiting a maximum modification width of ages to 20 years may prevent an age range of the morphable images from falling short of 10 years or exceeding 50 years. This modification limit may be equally applied when generating a face image.

In this instance, not only the feature extraction algorithm and the attribute of the morphable images described in the foregoing but also a variety of other feature extraction algorithms and attributes may be used. For example, other than AAM described previously, Principle Component Analysis (PCA), Linear Discriminant Analysis (LDA), Local Binary Pattern (LBP), Gabor Feature Vector or Scale Invariant Feature Transform (SIFT) may be used as a feature extraction algorithm in place thereof or in addition thereto. Using these feature extraction algorithms, a method of generating the morphable images of the object based on the attribute (for example, an age, a gender, an expression, and the like) is widely known in the art, and its description is omitted herein.

The feature comparison unit 130 compares the features of the candidate images generated by the candidate group generation unit 120 to features of a reference image. Also, the feature comparison unit 130 outputs a result of comparing the features of the both as at least one score.

Specifically, when it is assumed that n morphable images are included in the candidate images, the feature extraction unit 130 compares feature values for each of the n morphable images to feature values of the reference image, respectively. Also, the feature extraction unit 130 generates n scores respectively corresponding to the morphable images based on a result of the comparison.

As an embodiment, the reference image is a previously stored database image, and may be an image retrieved or read from the database 160.

As an embodiment, the feature extraction unit 130 calculates a difference between feature values of any one morphable image to feature values of the reference image, respectively, and generates a magnitude of the difference as a score for the morphable image. In this instance, the difference between the feature values may be calculated through a method such as Equation 1 below.

$$\underbrace{\begin{bmatrix} 100 \\ 30 \\ 20 \end{bmatrix}}_{\text{OBJECT}} - \underbrace{\begin{bmatrix} 90 \\ 20 \\ 40 \end{bmatrix}}_{\text{REFERENCE}} = \underbrace{\begin{bmatrix} 10 \\ 10 \\ -20 \end{bmatrix}}_{\text{DIFFERENCE}} \qquad \text{[Equation 1]}$$

Here, a first matrix at a left side denotes feature values of a morphable image, and a second matrix at the left side denotes feature values of a reference image. A matrix at a right side is a difference between the matrixes at the left side, and a magnitude of the difference becomes a score for the morphable image. For instance, in this example, the resulting score of the morphable image is determined by Equation 2.

$$\sqrt{10^2 + 10^2 + 20^2} = 10\sqrt{6} \qquad \text{[Equation 2]}$$

In this way, a score corresponding to each of the n morphable images is generated, and as a consequence, a total of n scores are generated.

The generated n scores are provided to the matching unit 140 to calculate a final score.

The matching unit 140 perform matching to generate one final score by matching the at least one score generated by the feature comparison unit 130. Also, the matching unit 140 determines whether the object image previously acquired by the image acquisition unit 110 and the reference image show a same person, based on a value of the generated final score.

As an embodiment, the matching may include calculating the final score through a matching method that differently weights each of the at least one score. For example, assume that morphable images are generated with varying ages, and each of the generated morphable images shows faces of 10, 20, 30, 40, and 50 years. Also, when the object is predicted to be 30 years as a result of analyzing the features of the photographed object image, the matching may be performed by setting a highest weight to a morphable image of 30 years closest to the predicted age and a lower weight to a morphable image more distant from the predicted age.

In this instance, age-dependent weighting described herein is just illustrative, and the scope of the present disclosure is not limited thereto. For example, the matching unit 140 may perform matching by predicting a gender of the object other than an age, and setting a higher weight to a morphable image of the same gender as the predicted gender and a lower weight to a morphable image of a different gender from the predicted gender.

As an embodiment, the matching unit 140 may perform matching by determining the final score from the at least one score based on a statistical or mathematical technique. In this instance, the at least one score may be the weighted scores described previously. For example, the matching unit 140 may perform matching by determining, as the final score, an average value, a sum, a product, a maximum value or a minimum value of the at least one score. Alternatively, the matching unit 140 may perform matching by selecting top m scores among all scores and determining a ratio between the selected scores as the final score. For example, the matching unit 140 may select a highest value (for example, 3) and a second highest value (for example, 2) among all scores, and may determine a ratio (3/2=1.5) between the selected values as the final score.

The matching unit 140 determines whether the object image and the reference image show a same person based on a value which the final score has. As an embodiment, as the final score has a value closer to a predetermined value, the matching unit 140 may determine, in a higher probability (hereinafter referred to as a match probability), that the object image and the reference image are images of a same person. For example, as the final score is closer to 0, the matching unit 140 may determine that the match probability is closer to 0, and as the final score is closer to 1, the matching unit 140 may determine that the match probability is closer to 1 (in this instance, assumption is that the final score is normalized to have a value between 0 and 1).

The classifier 150 is a module which stores a feature extraction algorithm, and may include AAM, PCA, LDA, LBP, Gabor Feature Vector, or SIFT as described previously.

As an embodiment, the classifier 150 may change its feature extraction algorithm through database-based self-learning (database-based self-learning function). Through this, the classifier 150 provides a feature extraction algorithm with further improved performance to the image recognition apparatus 100. A detailed description of the database-based self-learning method of the classifier 150 will be provided with reference to FIGS. 5 through 7.

The database 160 stores at least one reference image therein. The reference image represents an image previously photographed and stored and registered in the database 160, for example, a pre-registered photo of a permitted person or a photo of a criminal collected in the National Police Agency. The database 160 provides the reference image as a reference for the object image taken by the image acquisition unit 110.

The memory 170 provides a storage means to the image recognition apparatus 100. The memory 170 is a transitory or non-transitory storage medium, and may function as a cache memory or a data storage means for the image recognition apparatus 100. The memory 170 may include at least one of Static random access memory (SRAM), Dynamic RAM (DRAM), Phase Change RAM (PRAM), Magnetoresistive RAM (MRAM), Resistive RAM (RRAM), NAND flash memory, NOR flash memory, Solid State Drive (SSD), hard disks, floppy disks, magnetic tape, and other computer-readable data storage means.

According to the foregoing construction, the image recognition apparatus 100 generates the candidate images reflecting a likely age change, expression change, gender change, or change derived from a plastic surgery for the photographed object image, and verifies whether a face on the object image is the same as a face on the reference image by conducting a comprehensive analysis of a feature point difference between the candidate images and the reference image. Therefore, even if there is an appearance change of the object such as an age change, an expression change, a gender change or a change derived from a plastic surgery, identifying the object accurately may be achieved.

Also, image recognition performance may be enhanced by self-learning the database-based feature extraction algorithm, and further, variously morphable face images such as a montage may be provided through the variously modifiable face candidate group within limits to which sameness of the object is maintained.

Figure 2:
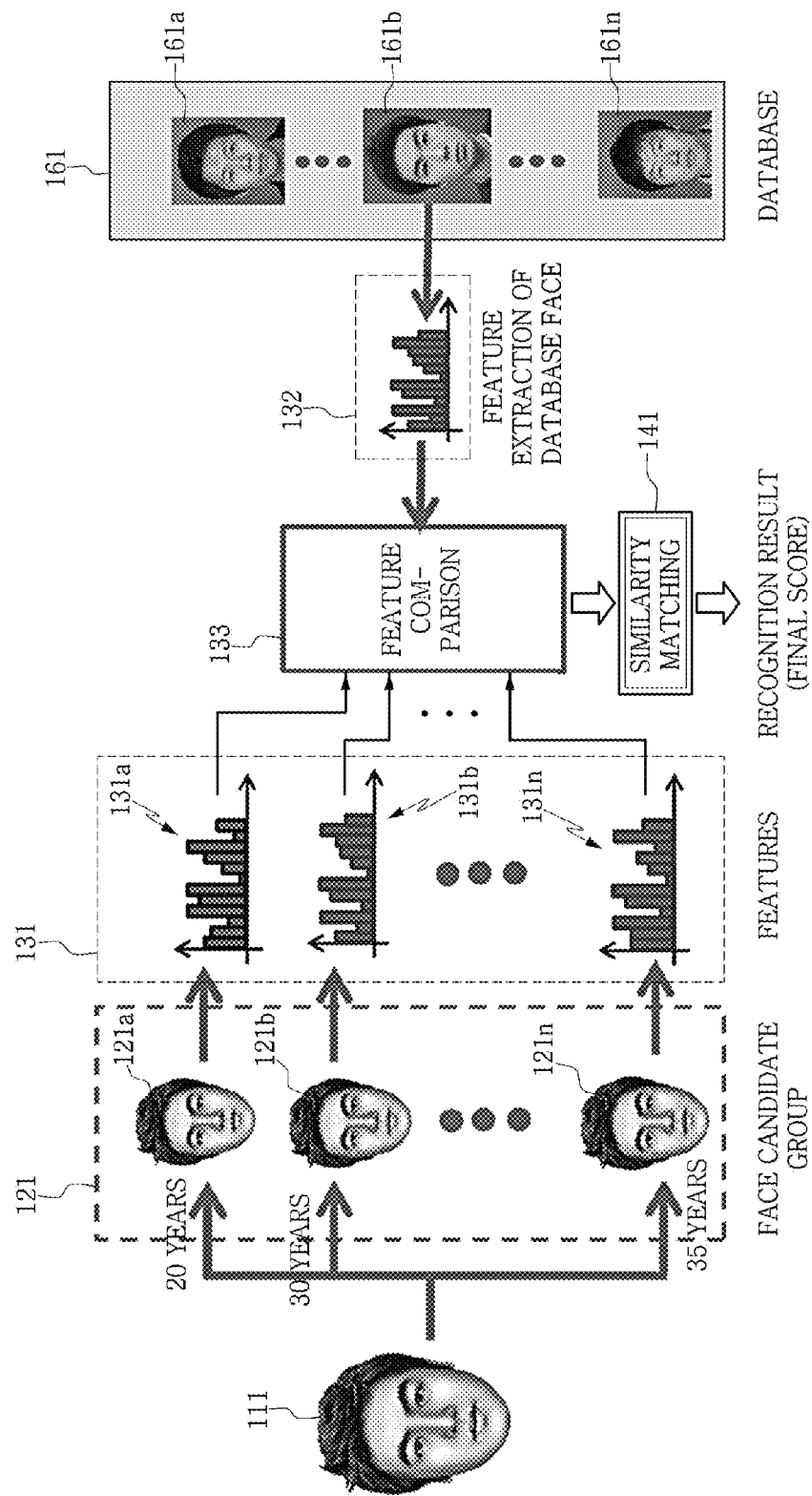
FIG. 2 is a schematic diagram illustrating a method for recognizing an image using the image recognition apparatus according to an exemplary embodiment.

FIG. 2 is a schematic diagram illustrating an image recognition method by the image recognition apparatus according to an exemplary embodiment. Referring to FIG. 2, a process of deriving a result of recognizing an object image 111 by the image recognition apparatus (100 in FIG. 1) of FIG. 1 is illustrated.

First, the image acquisition unit (110 in FIG. 1) acquires an object image 111. The object image 111 may be directly taken by the image acquisition unit 110 or may be read from an external storage device through the image acquisition unit 110. The object image 111 is a photo or image data of a face of an object intended to identify or recognize an image.

Also, the image recognition apparatus 100 generates candidate images 121 including at least one morphable image 121a, 121b, and 121n generated based on the object image 111. In the example of FIG. 2, assume that the candidate images 121 is an image of the object dependent on an age change (that is, when an age of the object is changed, a face image of the object predicted to change in response to the age change). As described previously, the morphable images may be generated using a feature extraction algorithm.

In this instance, the morphable images 121a, 121b, and 121n of the candidate images 121 may be generated by referring to a predetermined reference interval or a predetermined limit range. For example, if the predetermined reference interval is 10 years, the image recognition apparatus 100 may generate predicted images of 20, 30, 40 years, and so on, as the morphable images 121a, 121b, and 121n. Alternatively, if the predetermined limit range is from 10 to 35 years, the image recognition apparatus 100 may allow the morphable images 121a, 121b, and 121n to be generated within a range of 10 to 35 years. Alternatively, the image recognition apparatus 100 may generate the morphable images 121a, 121b, and 121n according to an arbitrary user-defined standard. For example, when the image recognition apparatus 100 is set to generate predicted images of 20, 30 and 35 years by a user definition method, the image recognition apparatus 100 generates the morphable image 121a of 20 years, the morphable image 121b of 30 years, and the morphable image 121n of 35 years accordingly.

In this instance, here, the morphable images are generated based on an age change of the object, but other morphable images may be also generated based on an expression change, a gender change, and a change derived from a plastic surgery of the object as described in FIG. 1.

Subsequently, the image recognition apparatus 100 extracts features 131 for the morphable images 121a, 121b, and 121n of the candidate images 121. The features 131 represent features of the face on the morphable images 121a, 121b, and 121n, and various features including a landmark point may be extracted. The features are extracted based on contours of ears, eyes, a nose and a mouth, a color boundary, a curvature point, and a brightness difference, and thus, they are generally plural in number.

Specifically, the image recognition apparatus 100 extracts a plurality of features 131a, 131b, and 131n respectively corresponding to the morphable images 121a, 121b, and 121n from the morphable images 121a, 121b, and 121n using the feature extraction algorithm described in FIG. 1. For each of the features 131a, 131b, and 131n, a horizontal axis represents factors or parameters of the feature, and a vertical axis represents frequencies (scales or values) of the factors or parameters. A specific method of extracting the features of the images using the feature extraction algorithm is widely known in the art, and its description is omitted herein.

In this instance, for comparison to the candidate images 121, the image recognition apparatus 100 reads a reference image 161b from a database (160 in FIG. 1) storing a plurality of database images 161. The reference image 161b may be a reference image selected from the plurality of database images 161a, 161b, and 161n in a sequential order or in random.

Also, the image recognition apparatus 100 extracts, from the read reference image 161b, a feature 132 for the reference image 161b. In the same manner as the feature 131 described previously, the feature 132 is extracted using the feature extraction algorithm described in FIG. 1, and a horizontal axis of the feature 132 represents factors or parameters of the feature and a vertical axis represents frequencies (scales or values) of the factors or parameters.

Also, the image recognition apparatus 100 generates at least one score by comparing the feature 131 extracted from the candidate images 121 to the feature 132 extracted from the reference image 161b. A specific method of generating the scores by comparing the features 131 and 132 is the same as described in FIG. 1, and for concise description, its description is omitted herein. A number of the generated scores rely on a number of the morphable images 121a, 121b, and 121n. For example, when a number of the morphable images 121a, 121b, and 121n is three, three scores are generated, and when a number of the morphable images 121a, 121b, and 121n is n, n scores are generated.

Finally, the image recognition apparatus 100 performs matching 141 to calculate one final score from the generated scores. Also, based on a value of the final score, the image recognition apparatus 100 identifies the object image 111 or determines whether the object image 111 is recognizable (that is, whether the object image 111 and the reference image 161b show a same person).

As an embodiment, in the process of matching 141, the image recognition apparatus 100 may reflect different weights corresponding to each of the morphable images 121a, 121b, and 121n. As an embodiment, the image recognition apparatus 100 may calculate one final score by applying a statistical or mathematical computation method to the generated scores.

A detailed description of a method of reflecting different weights and a method of applying statistical or mathematical computation to calculate the final score by the image recognition apparatus 100 is provided previously in FIGS. 1, and its description is omitted herein.

Figure 3:
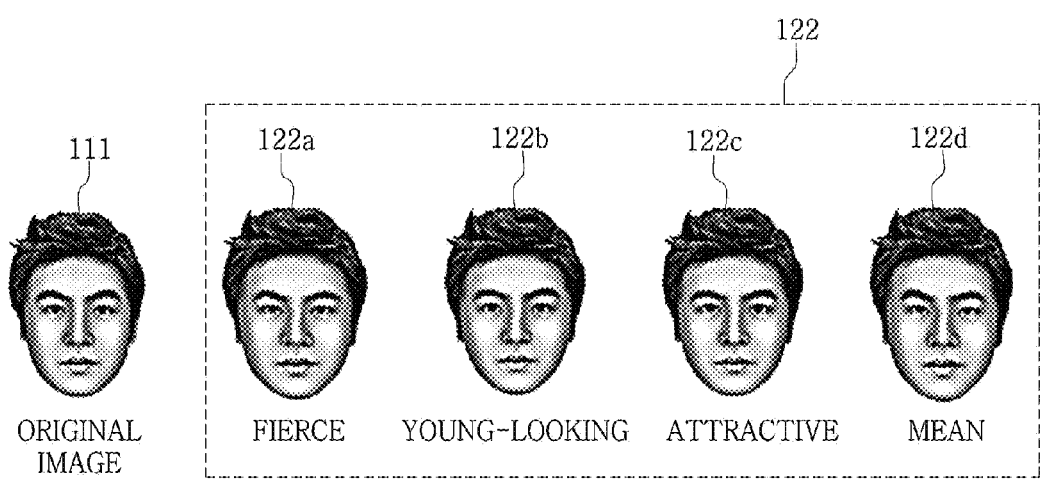
FIG. 3 is a diagram illustrating changes of a face image depending on a momentary expression of a human.

FIG. 3 is a diagram illustrating a face image changing with a human expression change. Referring to FIG. 3, the original image 111 representing an original object image and a plurality of morphable images 122 reflecting an expression change are illustrated.

In FIGS. 1 and 2 previously, the candidate group generation unit (120 in FIG. 1) or the candidate group image (121 in FIG. 2) were described, focusing a method of generating morphable images based on an age change of an object. In FIG. 3, as another embodiment, an example of generating morphable images based on an expression change of an object is described.

The original image 111 is an original image acquired by capturing the object. The image recognition apparatus (100 in FIG. 1) may generate new morphable images 122 by changing an expression of the object on the original image 111.

The generation of the morphable images 122 is performed using a feature extraction algorithm, similar to an age change. That is, features are extracted from the original image 111, values of features contributing an expression change among the extracted features are changed to a desired value (that is, a value pre-calculated to cause a desired expression change), and the image is re-produced based on the changed value, in this way, generation of the morphable image 122 is completed.

The morphable images 122 may include a plurality of morphable images 122a, 122b, 122c, and 122d of various expressions. For example, the morphable images 122 may include the morphable image 122a of a fierce expression, the morphable image 122b of a young-looking expression, the morphable image 122c of an attractive expression, or the morphable image 122d of a mean expression. The difference expressions for each of the morphable images 122a, 122b, 122c, and 122d may be attained by differently adjusting values of features contributing to an expression change. A specific value of features for causing a particular expression change may be obtained experimentally through repetitive experiments or by database-based self-learning as described later with FIGS. 5 through 7.

Figure 4:
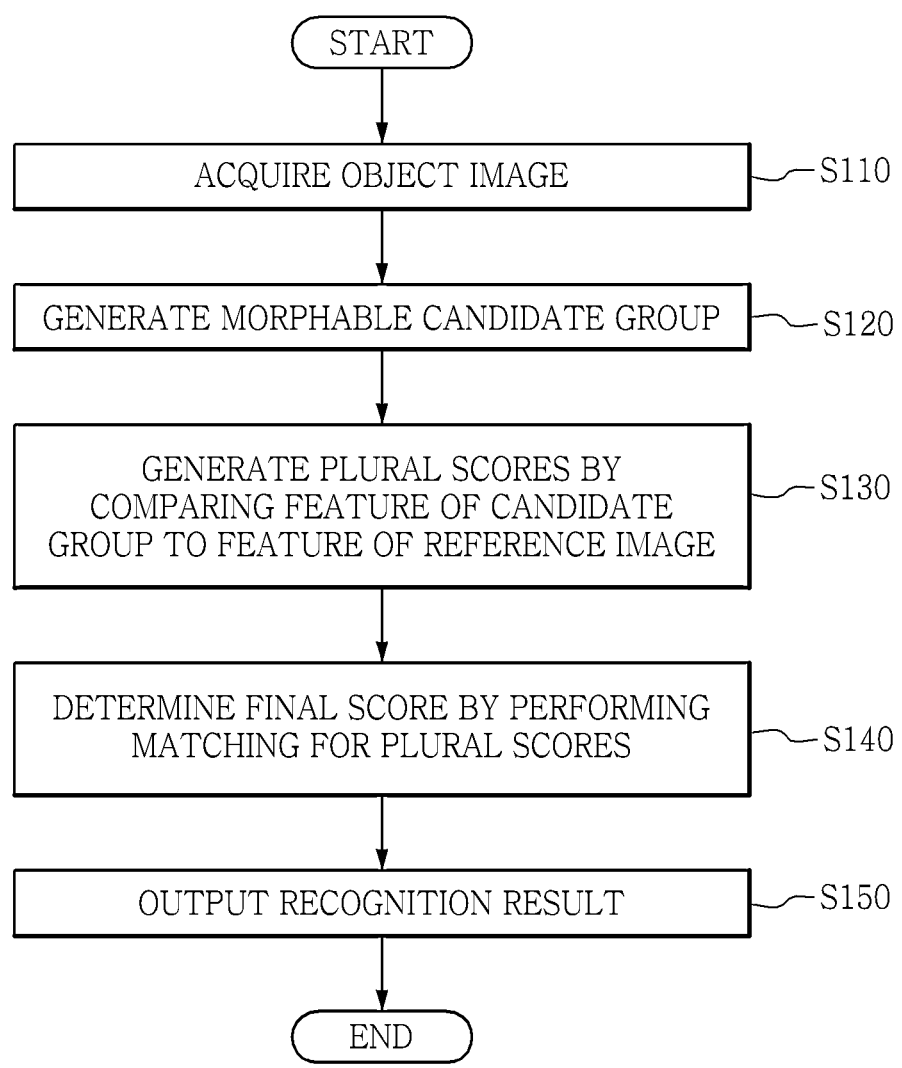
FIG. 4 is a flowchart illustrating a method for recognizing an image according to an exemplary embodiment.

FIG. 4 is a flowchart illustrating an image recognition method according to an exemplary embodiment. Referring to FIG. 4, the image recognition method includes S110 through S150.

In S110, the image recognition apparatus (100 in FIG. 1) acquires an object image, that is, an image acquired by capturing an object. The object image may be acquired through the image acquisition unit (110 in FIG. 1).

In S120, the image recognition apparatus 100 generates candidate images including a plurality of morphable images by modifying the object image based on various attributes.

The attribute being applied when generating the morphable image includes an age change, an expression change, a gender change, or a change derived from a plastic surgery, and the image recognition apparatus 100 may set a limit range of modification to control the morphable images to be morphable only within a predetermined range while not losing sameness as the original image.

In S130, the image recognition apparatus 100 generates a plurality of scores respectively corresponding to the morphable images in the candidate images by comparing features extracted from the candidate images to features of a reference image, respectively. A specific method of generating the plurality of scores by the image recognition apparatus 100 is the same as described in FIG. 1.

In S140, the image recognition apparatus 100 calculates one final score by performing matching for the plurality of scores generated in S130. A detailed description of matching is the same as described in FIGS. 1 and 2.

In S150, the image recognition apparatus 100 outputs a result of recognizing the object image (for example, whether the object image and the reference image are found to show a same person, which image in a database matches to the object image, and at that time, a match ratio/match probability) based on a value of the calculated final score.

In this instance, a detailed description of the image recognition apparatus 100 not described herein and its image recognition method is the same as described in FIGS. 1 through 3.

According to the foregoing construction, the image recognition apparatus 100 may generate the candidate images reflecting a likely age change, expression change, gender change or change derived from a plastic surgery for the photographed object image, and may verify whether the face on the object image is the same as the face on the reference image by conducting a comprehensive feature analysis between the candidate images and the reference image. Therefore, even if there is an appearance change of the object such as an age change, an expression change, a gender change or a change derived from a plastic surgery, identifying the object accurately may be achieved.

Figure 5:
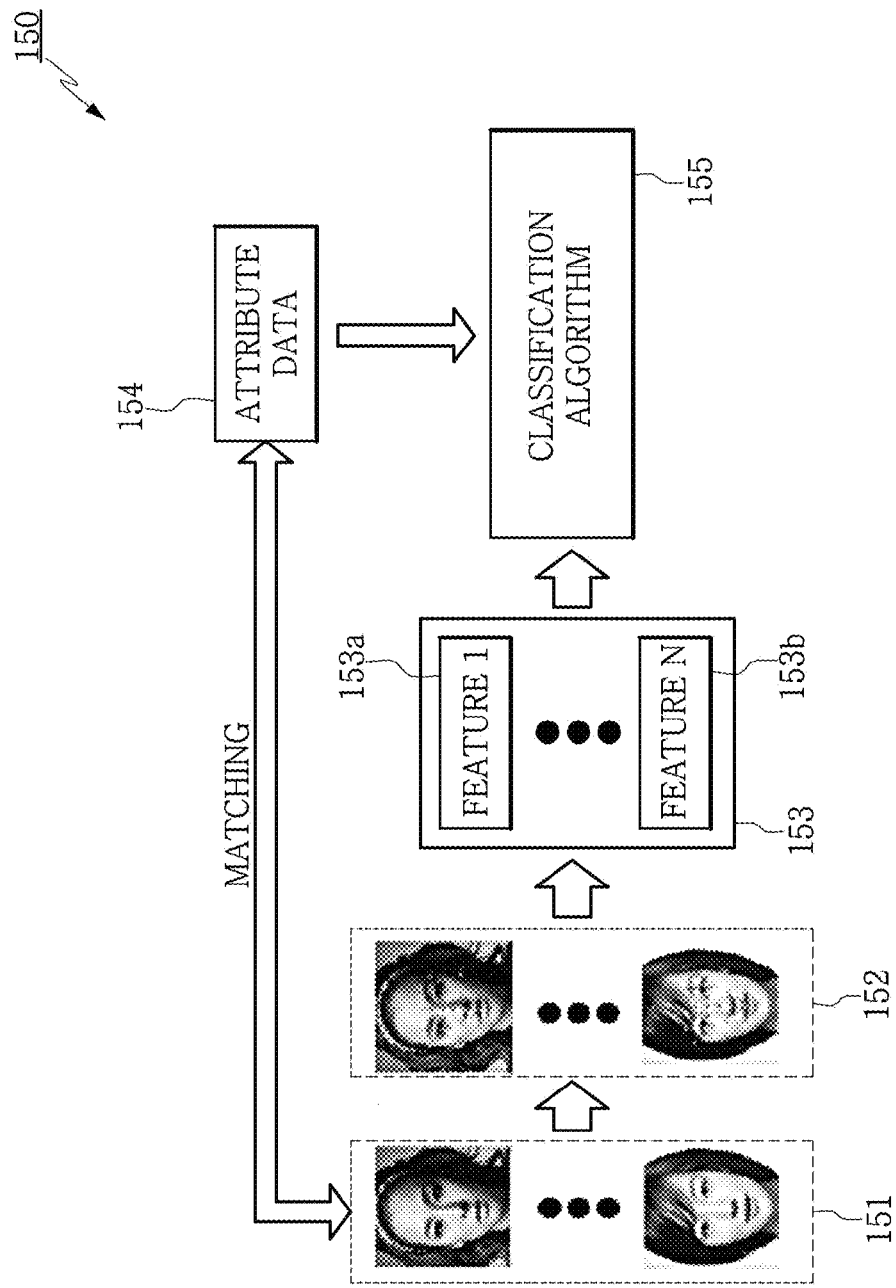
FIG. 5 is a schematic diagram illustrating an image recognition apparatus that self-learns a classification algorithm based on a database and its self-learning method according to an exemplary embodiment.

FIG. 5 is a schematic diagram illustrating the image recognition apparatus that learns a classification algorithm based on a database and its classification algorithm learning method according to an exemplary embodiment. Referring to FIG. 5, the classifier 150 enhances its classification algorithm by self-learning based on images 151 stored in the database. In this instance, the classification algorithm includes, for example, the feature extraction algorithm described in FIG. 1.

The classifier 150 conducts an image analysis 152 of the plurality of images 151 stored in the database (160 in FIG. 1) for database-based self-learning, and extracts features 153 for each of the plurality of images 151. Also, the classifier 150 conducts a statistical analysis of the extracted features 153 by referring to attribute data 154 matching to each of the plurality of images 151, and analyzes a correlation between the features 153 and the attribute data 154 as a result of the statistical analysis. Also, the classifier 150 updates or changes the classification algorithm 155 by applying the analyzed correlation to its classification algorithm 155 for better reflection of the correlation between the features 153 and the attribute data 154 on the classification algorithm 155.

More specifically describing, first, assumption is that the attribute data 154 matching to the plurality of images 151 includes gender and age information. In this instance, the attribute data 154 represents data previously examined and input or stored as reference information for the corresponding image. For example, in case in which an age and a gender of a person is examined and stored along with a photo of the person, the photo of the person is the database image 151, and the age and the gender of the person is the attribute data 154 matching to the database image 151.

Also, the classifier 150 analyzes a correlation between the attribute data 154 and the features 153 by a statistical analysis of the attribute data 154 and the features 153 together. For example, assuming that images of 25 years among the plurality of database images 151 are found to have values of first features 153a in a range of 10 to 20 among the features 153, and this value corresponds to a value of a significant range which is distinguished from images of different years (for example, images of different years have values of first features 153a between 30 and 40 or less than 5). In this case, when the value of the first feature 153a is between 10 and 20, the classifier 150 conducts a correlation analysis with a high probability that the image 151 will be an image of a 25-year-old person, and trains its classification algorithm 155 based on the analysis result.

As another example, assuming that images of females among the plurality of database images 151 are found to have values of second feature 153b in a range of 100 to 150 among the features 153, and this value corresponds to a value of a significant range which is distinguished from images of a different gender (for example, images of a different gender have values of second features 153b between 300 and 400). In this case, when the value of the second feature 153b is between 100 and 150, the classifier 150 conducts a correlation analysis with a high probability that the image 151 will be an image of a female person, and trains its classification algorithm 155 based on the analysis result.

The database-based leaning of the classification algorithm helps to enhance performance of the classification algorithm. For example, as in the previous example, when the correlation between the first feature 153a and the age of the image 151 is learned, a predicted age of the object image (111 in FIG. 2) may be estimated more correctly by extracting the features of the object image 111 and identifying the value of the first feature 153a among the features (if the value of the first feature 153a is between 10 and 20, there is a high probability that the predicted age will be 25 years).

This also helps to generate morphable images. For example, when the correlation between the first feature 153a and the age is learned, a morphable image of 25 years may be generated more accurately by adjusting the value of the first feature 153a to a value in a range of 10 to 20 when generating the morphable image of 25 years.

This correlation between the feature 153 and the attribute data 154 is derived from a probability statistics means, and thus, with the accumulation of analyzed correlation data by continuous repetition of database-based self-learning, performance of the classification algorithm 155 may be further improved.

In this instance, although the foregoing description is provided focusing on a database-based self-learning method, this is just illustrative and the image recognition apparatus 100 may learn the feature extraction algorithm by other methods. For example, the image recognition apparatus 100 may allow the feature extraction algorithm to reflect manual image modification by user manipulation.

For example, when the value of the first feature 153 is between 20 and 30, if a user manually manipulates a predicted age to be 25 years, the feature extraction algorithm learns that the predicted age is 25 years when the value of the first feature 153 is between 20 and 30, in response to the manual manipulation of the user.

According to the foregoing construction, the image recognition apparatus 100 may enhance image recognition performance by self-learning the feature extraction algorithm based on the database or manual manipulation of the user.

Figure 6:
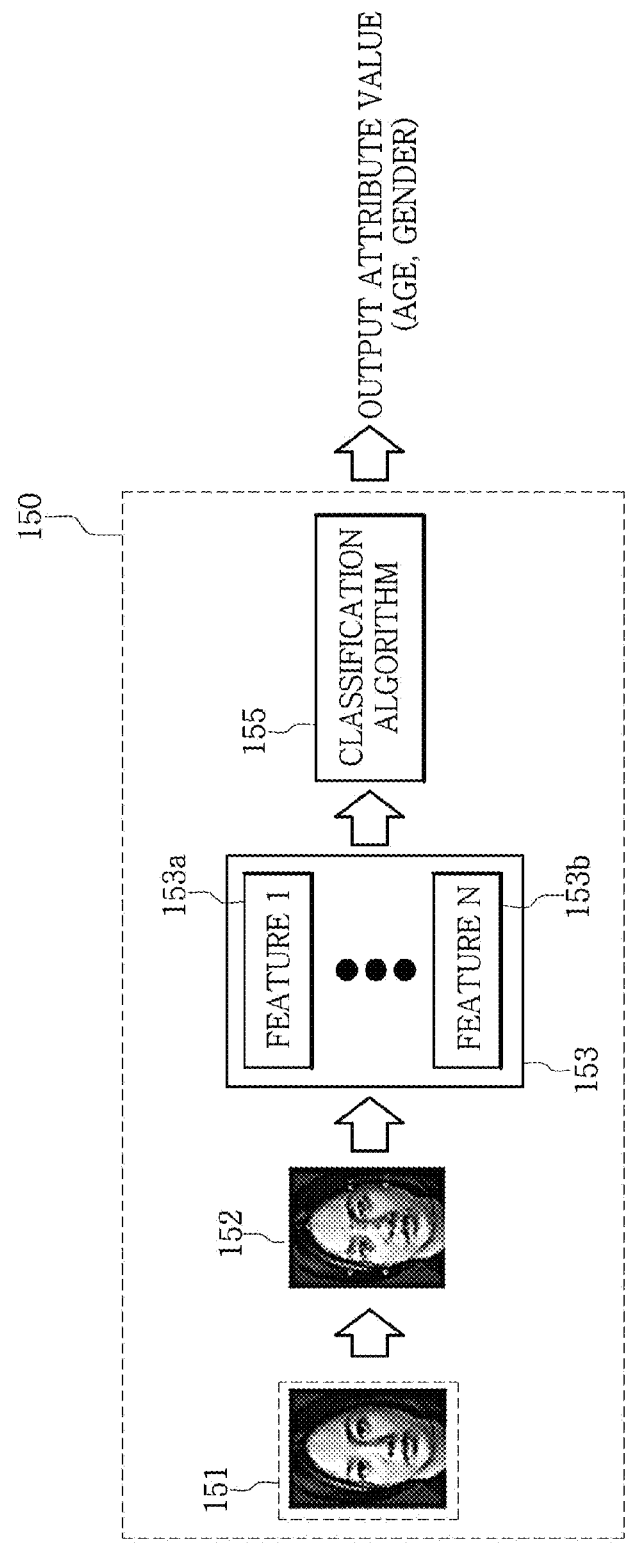
FIG. 6 is a schematic diagram illustrating a method of extracting an attribute value of an object from a photographed image using a classification algorithm self-learned.

FIG. 6 is a schematic diagram illustrating a method of extracting the attribute value of the object from the photographed image using the classification algorithm learned by the method of FIG. 5.

In FIG. 6, assume that the classifier 150 estimates attribute data (an age and a gender) of the object image 151. The classifier 150 first conducts an image analysis 152 of the object image 151, and extracts the plurality of features 153. Also, the classifier 150 analyzes the extracted feature 153a through the classification algorithm 155, and estimates and outputs an attribute data value of the object image 151.

For example, assumption is that the classification algorithm 155 of FIG. 6 is the classification algorithm learned based on the database in FIG. 5. Also, assume that among the features 153 extracted from the object image 151, the value of the first feature 153a is 15 and the value of the second feature 153b is 130.

In this instance, because the value of the first feature 153a is between 10 and 20, the classification algorithm 155 may estimate and output a predicted age of the object image 151 to be 25 years from the value of the first feature 153a as previously learned based on the database. Similarly, because the value of the second feature 153b is between 100 and 150, the classification algorithm 155 may estimate and output a predicted gender of the object image 151 to be female.

FIG. 7 is a schematic diagram illustrating a method whereby the image recognition apparatus provides face images variously morphable through a modifiable face candidate group within limits to which sameness of an object is maintained according to an exemplary embodiment. Referring to FIG. 7, a method for generating a plurality of face images 230 variously morphable from an object image 210 based on an age is illustrated.

First, the image recognition apparatus (100 in FIG. 1) receives an object image 210. In this instance, it is assumed that the object image 210 corresponds to an image acquired by capturing an object long before, and is an image much different from a presently predicted face of the object.

The image recognition apparatus 100 generates a plurality of morphable images 220 from the object image 210 based on an age change. For example, the morphable images 220 may be morphable images generated at a 10 year interval in a range between 5 years and 75 years from left to right. That is, among the morphable images 220, the leftmost image is a predicted image when the object is 5 years old, and the rightmost image is a predicted image when the object is 75 years old.

Subsequently, the image recognition apparatus 100 generates respective face images 230 based on the generated morphable images 220. In this instance, the generated face image 230 may include a montage or a photo of the object. A method of generating the face image 230 from the morphable images 220 may use a face image generation technique being generally widely known.

Taking a look at the face image 230 generated by this method, it can be seen that a 25-year-old face image very similar to a 27-year-old photo 240 of the object is generated. That is, even if there is no current photo of the object (in this case, there is only a photo when the object was young), a face image very similar to a current appearance of the object may be acquired through generating a morphable image of a predicted age.

In this instance, only a face image generation technique based on an age change is illustrated herein, however the scope of the present disclosure is not limited thereto. For example, various face images may be generated based on a gender change, an expression change, or a change derived from a plastic surgery, and in this case, may be generated only by changing the attribute of the morphable image 220 based on a gender change, an expression change, or a change derived from a plastic surgery.

According to the foregoing construction, the image recognition apparatus 100 may generate a predicted face image of the object using images variously morphable based on a desired attribute.

While specific embodiments are described in the detailed description of the specification hereinabove, various changes in form and details may be made on each embodiment without departing from the scope of the present disclosure.

Also, although particular terms are used herein, this is just used for the purpose of describing the present disclosure but is not intended to define the meaning or limit the scope of the specification set forth in the claims. Therefore, the scope of the specification should not be limited to the disclosed embodiments and will be defined by the appended claims and equivalents thereto.

What is claimed is:

1. A method for recognizing a face from an object image, comprising:
   executing, by one or more processors, each of:
   generating a transformed image of the object image by transforming facial features of the object image;
   extracting a first feature from the transformed image;
   extracting a second feature from a reference image;
   generating an initial score corresponding to the transformed image as a difference value between the first feature and the second feature;
   performing matching the initial score with the transformed image to calculate a final score for the object image; and
   recognizing the face in the object image based on the final score,
   wherein the first feature is extracted from the transformed image using an algorithm comprising:
   extracting features from a plurality of images stored in a database;
   analyzing a correlation between the extracted features and attribute data matching each of the plurality of images; and
   updating or changing the algorithm based on a result of the analysis.

2. The method according to claim 1, further comprising:
   outputting a match probability or a match ratio between the object image and the reference image based on the final score.

3. The method according to claim 1, wherein the transformed image is generated by modifying the object image based on an attribute.

4. The method according to claim 3, wherein the attribute relates to changes based on an age, a gender change, an expression, or a plastic surgery.

5. The method according to claim 1, wherein generating the initial score comprises:

calculating a difference by subtracting a value corresponding to the second feature from a value corresponding to the first feature; and determining a magnitude of the difference as the initial score.

6. The method according to claim 1, wherein performing the matching comprises weighting the initial score.

7. The method according to claim 1, wherein performing the matching comprises calculating the final score based on any of an average value, a sum, a product, a maximum value, or a minimum value of the initial score and other scores.

8. The method according to claim 1, wherein performing the matching comprises calculating the final score based on a ratio comprising the initial score and other scores.

9. The method according to claim 1, wherein the first feature and other features extracted using the algorithm relate to the transformed image and other transformed images in one to one correspondence.

10. The method according to claim 1, wherein the algorithm is updated or changed through self-learning based on manual image modification caused by manipulation.

11. The method according to claim 1, wherein the attribute data has been examined and stored as reference information for the plurality of images.

12. The method according to claim 1, wherein a value of the final score indicates whether the object image and the reference image are the same.

13. An apparatus for recognizing an image, comprising:
an image acquirer configured to acquire an object image;
a processor, comprising:
   a candidate group generator configured to generate a transformed image of the object image by transforming facial features of the object image;
   a feature comparator configured to extract a first feature from the transformed image, to extract a second feature from a reference image different from the object image, and to generate an initial score corresponding to the transformed image as a difference value between the first feature and the second feature; and
   a matcher configured to perform matching of the initial score with the transformed image to calculate a final score,
wherein the first feature is extracted from the transformed image using an algorithm comprising:
   extracting features from a plurality of images stored in a database;
   analyzing a correlation between the extracted features and attribute data matching each of the plurality of images; and
   updating or changing the algorithm based on a result of the analysis.

* * * * *